(12) United States Patent
Purpura (10) Patent No.: US 9,108,739 B2
(45) Date of Patent: Aug. 18, 2015

(54) TAXIING AIRCRAFT VICINITY VISUALIZATION SYSTEM AND METHOD

(71) Applicant: The Boeing Company, Chicago, IL (US)

(72) Inventor: William Joseph Purpura, Anaheim, CA (US)

(73) Assignee: The Boeing Company, Chicago, IL (US)

( * ) Notice: Subject to any disclaimer, the term of this patent is extended or adjusted under 35 U.S.C. 154(b) by 74 days.

(21) Appl. No.: 13/887,062

(22) Filed: May 3, 2013

(65) Prior Publication Data
US 2014/0330454 A1   Nov. 6, 2014

(51) Int. Cl.
| | | |
|---|---|---|
| *G01C 23/00* | (2006.01) | |
| *B64D 45/00* | (2006.01) | |
| *G08G 5/06* | (2006.01) | |
| *G08G 5/00* | (2006.01) | |
| *H04B 3/54* | (2006.01) | |

(52) U.S. Cl.
CPC .............. *B64D 45/00* (2013.01); *G08G 5/065* (2013.01); *G08G 5/0021* (2013.01); *H04B 3/54* (2013.01)

(58) Field of Classification Search
CPC .... B64C 19/00; B64C 13/50; B64C 220/123; B64C 2201/146; B64D 2221/00; B64D 47/00; G05D 1/00; G05D 1/0202

USPC ............................................................ 701/3
See application file for complete search history.

(56) References Cited

U.S. PATENT DOCUMENTS

| | | | | |
|---|---|---|---|---|
| 2,933,726 | A | * | 4/1960 | Campbell et al. ............. 342/451 |
| 3,025,514 | A | * | 3/1962 | Alexander et al. .............. 342/29 |
| 3,097,354 | A | * | 7/1963 | Blowney et al. ................ 342/30 |
| 6,118,401 | A | | 9/2000 | Tognazzini |
| 2008/0300750 | A1 | | 12/2008 | Davis et al. |
| 2009/0164122 | A1 | | 6/2009 | Morbey et al. |

OTHER PUBLICATIONS

NTSB Safety Recommendation 20120904, 4 pages.
International Search Report and Written Opinion dated Jul. 11, 2014 from International Application No. PCT/US2014/031077.

\* cited by examiner

*Primary Examiner* — Behrang Badi
*Assistant Examiner* — Daniel L Greene (57) ABSTRACT

According to an embodiment, a method provides information regarding the vicinity of a vehicle. The method includes, in the vehicle, providing a sensor signal representative of an environmental condition in a vicinity of the vehicle, transmitting the sensor signal over a power line in the vehicle, receiving the sensor signal transmitted over the power line and transmitting a corresponding wireless sensor signal in the vehicle, receiving the wireless sensor signal and recovering the sensor signal, and presenting the recovered sensor signal in a human-perceivable form.

25 Claims, 5 Drawing Sheets

TAXIING AIRCRAFT VICINITY VISUALIZATION SYSTEM AND METHOD

BACKGROUND

The pilots of some large aircraft may not be able to easily see the wingtips of their aircraft and may have difficulty discerning whether there is sufficient clearance for a wingtip of their aircraft to pass by an object, especially if the weather is bad or it is nighttime. This reduced visibility may be a factor in several incidents wherein the wingtips of a large aircraft have struck another aircraft or a fixed object during taxi. If such a collision occurs the aircraft will be removed from service until it has been inspected and, if necessary, repaired. The United States National Transportation Safety Board (NTSB) has issued a Safety Recommendation to the Federal Aviation Administration (FAA) for installation of anti-collision aids, such as onboard camera systems, to help pilots with clearance issues during taxi.

SUMMARY

This Summary is provided to introduce a selection of concepts in a simplified form that are further described below in the Detailed Description. This Summary is not intended to be used to limit the scope of the claimed subject matter. Concepts and technologies described herein provide for an aircraft vicinity visualization system and method, and at least one example of using same.

According to an aspect of the present disclosure there is provided an aircraft which includes a fuselage, a cockpit connected to the fuselage, and an aircraft component connected to the fuselage. The aircraft component has a first sensor, a first communication module, and a first power line; the fuselage has a second communication module and a second power line; and the cockpit has a human interface unit and a third communication module. The first sensor is connected to the first communication module and is responsive to an environment in the vicinity of the aircraft to provide first sensor data. The first communication module is connected to the first power line and places a first power line data signal on the first power line by modulating a power line data carrier with the first sensor data. The second power line is connected to the first power line. The second communication module is connected to the second power line and receives the first power line data signal on the second power line, retrieves the first sensor data from the first power line data signal, and transmits a wireless data signal by modulating a wireless data carrier with the first sensor data retrieved from the first power line data signal. The third communication module receives the wireless data signal, retrieves the first sensor data from the wireless data signal, and provides the first sensor data to the human interface unit. The human interface unit is connected to the third communication module and presents the first sensor data in a human-perceivable form.

According to a further aspect of the present disclosure there is provided an aircraft vicinity visualization system for an aircraft having a fuselage, a cockpit connected to the fuselage, and an aircraft component connected to the fuselage, the aircraft component having an aircraft power bus which is connected to a fuselage power bus in the fuselage which includes a sensor module, an aircraft component communication module, a fuselage communication module, a cockpit communication module, and a human interface unit. The sensor module is configured to be installed in an aircraft component, and is responsive to an environment in a vicinity of the aircraft to provide a sensor signal representative of the environment. The aircraft component communication module is configured to be installed in the aircraft component and connected to the aircraft power bus, and is responsive to the sensor signal to place a power line sensor signal on the aircraft power bus. The fuselage communication module is configured to be installed in a fuselage of the aircraft and connected to the fuselage power bus, and to receive the power line sensor signal and transmit a corresponding wireless sensor signal. The cockpit communication module is configured to be installed in or near a cockpit of the aircraft, and to receive the wireless sensor signal and provide a recovered sensor signal. The human interface unit is configured to be installed in the cockpit and connected to the cockpit communication module, and is responsive to the recovered sensor signal to provide information regarding the environment in a human-perceivable form. An aircraft would have a fuselage, a cockpit connected to the fuselage, and an aircraft component connected to the fuselage, the aircraft component has an aircraft power bus which is connected to a fuselage power bus in the fuselage.

According to a further aspect of the present disclosure there is provided a vehicle environment sensing system for a vehicle and which has a first section and a human operator area in a second section which includes a sensor module, a sensor communication module, an intermediate communication module, a wireless communication module, a human interface unit, and a user control. The sensor module is configured to be installed in the first section. The sensor module responds to an environment of the vehicle to provide a sensor signal representative of the environment, and also responds to a control signal to adjust an operation of the sensor module. The sensor communication module is configured to be installed in the first section and connected to the sensor module and to a vehicle power bus in the first section. The sensor communication module responds to the sensor signal to place a power line sensor signal on the vehicle power bus, and responds to a power line control signal on the vehicle power bus to provide the control signal to the sensor module. The intermediate communication module is configured to be installed in a second section of the vehicle and connected to the vehicle power bus in the second section. The intermediate communication module receives the power line sensor signal and transmits a corresponding wireless sensor signal, and receives a wireless control signal and places a corresponding power line control signal on the vehicle power bus. The wireless communication module is configured to be installed in or near a human operator area in the second section of the vehicle. The wireless communication module receives the wireless sensor signal and provides a recovered sensor signal, and responds to a control signal to transmit a corresponding wireless signal as the wireless control signal. The human interface unit is configured to be installed in a human operator area and connected to the wireless communication module. The human interface unit responds to the recovered sensor signal to provide information regarding the environment in a human-perceivable form. The user control is configured to be installed in the human operator area and connected to the wireless communication module. The user control generates the control signal to control the operation of the sensor.

According to a further aspect of the present disclosure there is provided a method which provides information regarding the vicinity of a vehicle. The method includes, in the vehicle, providing a sensor signal representative of an environmental condition in a vicinity of the vehicle, transmitting the sensor signal over a power line in the vehicle, receiving the sensor signal transmitted over the power line and transmitting a corresponding wireless sensor signal in the vehicle, receiving the wireless sensor signal and recovering the sensor signal, and presenting the recovered sensor signal in a human-perceivable form.

The features, functions, and advantages that have been discussed can be achieved independently in various configurations of the present disclosure or may be combined in other configurations, further details of which can be seen with reference to the following description and drawings. For example, only a single type of sensor may be used. As another example, communications may only be from a sensor to a display, and not bidirectional.

DETAILED DESCRIPTION

The following detailed description is directed to systems and methods for providing information regarding the vicinity of a vehicle, such as but not limited to an aircraft. The system provides for viewing the environment in the vicinity of, for example, the aircraft or the wingtips of an aircraft and even viewing parts of the aircraft itself. In the following detailed description, references are made to the accompanying drawings that form a part hereof, and which are shown by way of illustration, specific configurations, or examples. Like numerals represent like elements through the several figures.

It would seem to be a simple task to provide information regarding objects in the vicinity of an aircraft to the pilot by simply providing an electrical cable, such as a coaxial cable, from a sensor to a cockpit display. This, however, adds weight to the aircraft, adds another level of complexity to the manufacture of the aircraft, would have to be tested to verify that the cable did not adversely affect the airworthiness or structural integrity of the aircraft, may require approval by one or more government agencies, and does not provide for convenience retrofitting onto existing aircraft.

Another approach would be to put the sensor signal onto the aircraft power bus at the sensor and retrieve it at the cockpit. The various electrical panels and electrical systems between a sensor and a display in the cockpit in an aircraft would, however, seriously attenuate any signal transmitted onto the power buses, and introduce substantial noise, so that the power levels required to transmit a signal from the sensor to the cockpit over the aircraft power buses would be impractical.

Another approach would be to wirelessly transmit the sensor signal directly from the sensor to a cockpit display. The metal frame and skin of the aircraft would, however, require significant transmitter power to reliably convey the signal from the sensor to the cockpit, and control signals from a cockpit display back to the sensor. Further, the FAA has set requirements for low electromagnetic emissions within the fuselage of an aircraft, and in particular within the cabin of such aircraft.

The various systems and methods disclosed herein address the deficiencies of these straightforward approaches, and provide the desired information to a flight crew member or others in a manner which minimizes changes to the aircraft, can be easily retrofitted onto existing aircraft, and complies with applicable FAA power requirements. According to one or more embodiments, a sensor signal is transmitted over an aircraft power bus, from the sensor to a point inside the fuselage, and then the sensor signal is wirelessly re-transmitted from that point to a cockpit display or other display area. The sensor may be, for example, a camera, which can be controlled by an operator, such as the pilot or copilot, to scan a field of view that may include a region directly ahead of the aircraft, a region on the side of the aircraft during taxi, or a region somewhat behind the aircraft during pushback from the gate. In this way, the pilot or flight crew member can directly visualize the environment around the airplane, including the wingtips and wingtip paths. As mentioned below, there can be more than one sensor, the sensors can be of different types, and the sensors can be placed in different locations on the aircraft. The system and method can also be used in vehicles other than aircraft.

Figure 1:
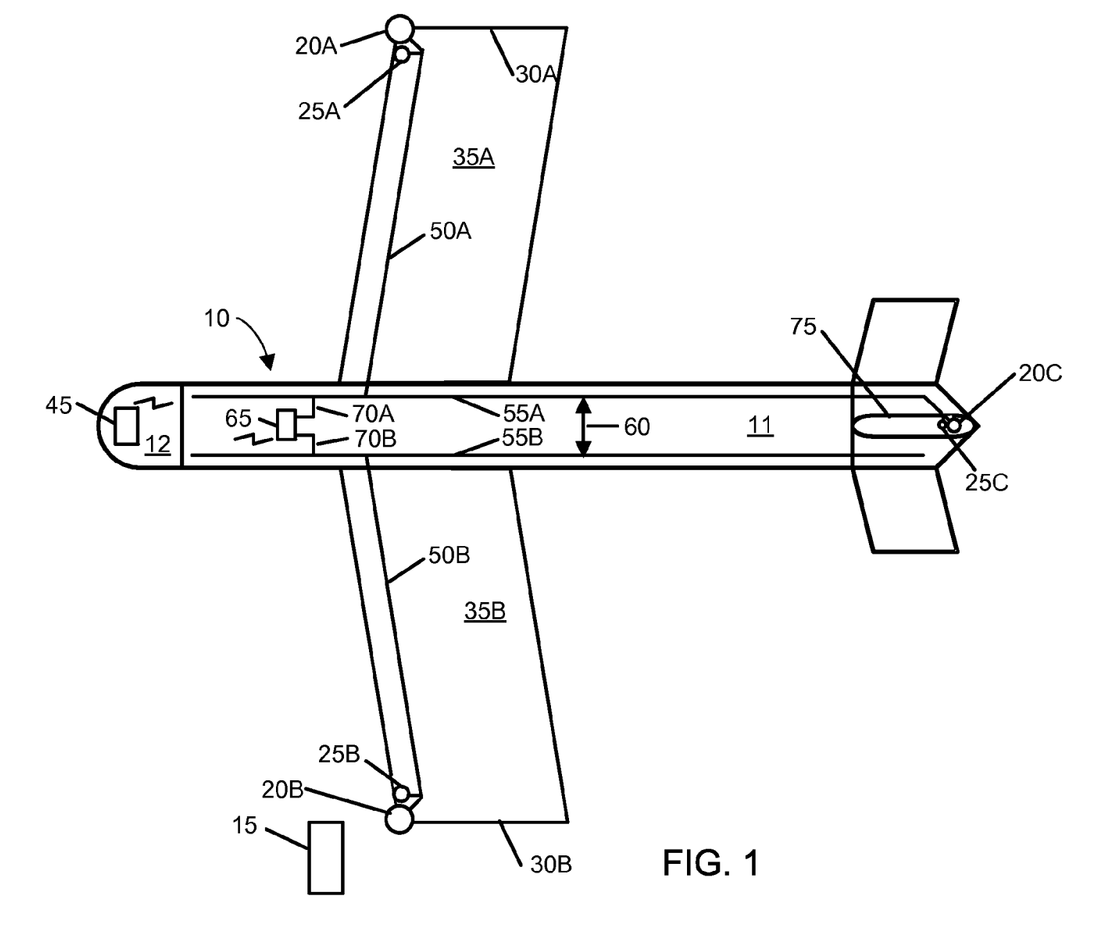
FIG. 1 is an illustration of an exemplary aircraft, an exemplary object, and some parts of an exemplary communication system between an exemplary sensor module and an exemplary human interface unit in the cockpit.

FIG. 1 is an illustration of an exemplary aircraft 10 having a fuselage 11, a cockpit 12, and wings 35A, 35B, an exemplary object 15, and some parts of an exemplary communication system between exemplary sensor modules or systems 20A, 20B, and an exemplary human interface unit 45 in the cockpit 12. The object 15 may be, for example, a motor vehicle, the tail, wing or cockpit of another aircraft, a light, a barrier, or other fixed or movable object adjacent to or in the vicinity of aircraft 10. In one implementation, a sensor system 20A, 20B is installed at or near the wingtip 30A, 30B, of each wing 35A, 35B of the aircraft. A sensor system 20 may also be installed at other locations and/or on or in other aircraft components where power is already available or readily accessible, such as, but not limited to, a sensor system 20C installed at or near the top of an aircraft tail section vertical stabilizer 75. A sensor system 20 may include, for example, one or more of a camera, an infrared (IR) sensor, an ultraviolet light sensor, a proximity sensor, or other suitable sensor, sensor array, or detection device. The cockpit 12 contains a human interface unit 45 which can present information in a human-perceivable format, such as, for example, a visual display, an audible alarm, and/or a vibration in a control device, such as a steering wheel, handle, yoke, joystick, or other user interface. As explained further below, the sensor system 20 communicates information regarding the environment around the aircraft, or the condition of the aircraft, to the human interface unit, which then presents the information to the pilot or other flight crew member, including a co-pilot, flight engineer, or other safety monitor located on-board or off-board the aircraft. It is within the scope of this disclosure to wirelessly transmit the information regarding the aircraft around the aircraft to an individual or automatic monitoring system located at an airport or other facility where the vicinity information and environment are analyzed and feedback may be provided to the pilot, flight crew member, or flight operations personnel, regarding safe operation of an aircraft. The environment information may be presented, for example, as a picture, a visual warning, an indication of the distance to an object, an audible alarm, vibration, etc., as appropriate, so that the pilot or other personal are alerted to and/or notified of any hazardous conditions, and can make an informed judgment, for example, as to whether there is sufficient clearance for the aircraft to pass the object. An audible alarm or sound may be one or more of a tone, chime, buzz, siren, verbal announcement, etc. Further, different conditions may prompt different alarm sounds and/or verbal announcements.

The human interface unit 45 may also, if desired, contain a control unit (FIG. 3), such as, for example, a joystick, buttons, mouse, etc., which allows the pilot to control the operation of the sensor system. The pilot may control, for example, the zoom of a camera, the focus of a camera, and/or the direction that a camera is pointing. The pilot may also, if desired, switch between a camera, an infrared sensor, an ultraviolet light sensor, or a proximity sensor, and may cause the sensor to use an electronic or passive filter to pass, or block, certain colors, wavelengths, and/or to instruct the proximity sensor to ignore objects beyond a predetermined or selected range, etc.

A landing light system 25A, 25B in a wing 35A, 35B is powered by a wing power line (power bus) 50A, 50B in that wing 35A, 35B, which is connected to a fuselage power line (power bus) 55A, 55B, respectively. Typically, there are two fuselage power buses 55A, 55B, which may be connected or disconnected, as desired, by one or more crossover buses 60. The tail section vertical stabilizer typically has a beacon or recognition light 25C.

A sensor system 20 may include a sensor 255 (FIG. 2) which may provide data regarding an environmental condition in the vicinity of the wingtip or the aircraft, or the condition of the aircraft. A sensor communication module, such as a power line communication module (210 of FIG. 2), places sensor data from the sensor system onto the wing power bus 50, which couples the sensor data onto the fuselage power bus 55. An intermediate communication module 65, such as a power line and wireless communication module, is coupled to the wing power buses 55 by, for example, electrical conductors 70. The intermediate communication module 65 retrieves the sensor data from the power buses 55 and wirelessly transmits the sensor data. An interface communication module 320, such as a wireless communication module (FIG. 3), receives the wireless data signal, retrieves the wirelessly transmitted sensor data, and provides the sensor data to the human interface unit 45. For convenience of discussion, the sensor communication module, intermediate communication module, and interface communication module will generally be referred to as a power line communication module, a power line and wireless communication module, and a wireless communication module, respectively.

The control signals from the control unit 315 (FIG. 3) are provided to the wireless communication module which wirelessly transmits the control signals. The power line and wireless communication module 65 receives the wireless control signal, retrieves the wirelessly transmitted control data, and places control data onto the power bus 55, which couples a power line control signal onto the wing power bus 50. The power line communication module 210 (FIG. 2) receives the power line control signal, retrieves the control data, and provides the control data to the sensor module 20.

Thus, the sensor data is transmitted by one communication technique, for example, power line communication, from the sensor module to the fuselage, and is transmitted by another communication technique, for example, wireless communication, within the fuselage to the display in the cockpit. Similarly, the control data is transmitted by one communication technique, for example, wireless communication, within the fuselage from the control unit in the cockpit, and is transmitted by another communication technique, for example, power line communication, from the fuselage to the sensor module. This two-communication technique approach allows low power to be used for the wireless communications, as these occur within the fuselage rather than having to penetrate the skin of the fuselage. A communication module that wirelessly transmits a sensor control signal for a sensor may transmit a wireless signal at a power level that is in compliance with FAA or other governmental requirements regarding the power level of radio emissions in the cabin or another part of an aircraft, or in a section of a vehicle.

The sensor module may include a sensor, may include a plurality of sensors, and/or may include one or sensors along with control mechanism(s) for the sensor(s).

The sensor(s) may be placed in any desired and appropriate location on the aircraft or vehicle as long as external power, such as an aircraft power line, is available. For example, in addition to the locations mentioned above for sensors 20A, 20B, and 20C, the sensor(s) could be placed in a wheel well, on the landing gear, or on or in another aircraft component. An "appropriate" location is any location from which the sensor (s) can provide the desired view of the environment and where the sensor(s) do not substantially adversely affect the performance, reliability, or safety of the aircraft or vehicle.

Information obtained by the sensor(s) may be transmitted by the wireless communication module, or even by the aircraft or vehicle radio system (not shown), to another human being at an external location, or even for archival purposes. The external location could have a wireless or other receiver for receiving the transmissions, recovering the sensor signal, and presenting the recovered sensor signal in a human-perceivable form and/or storing the sensor signal. Also, the information obtained by the sensor could be recorded on a flight data or flight voice recorder, or other suitable recording device.

Figure 2:
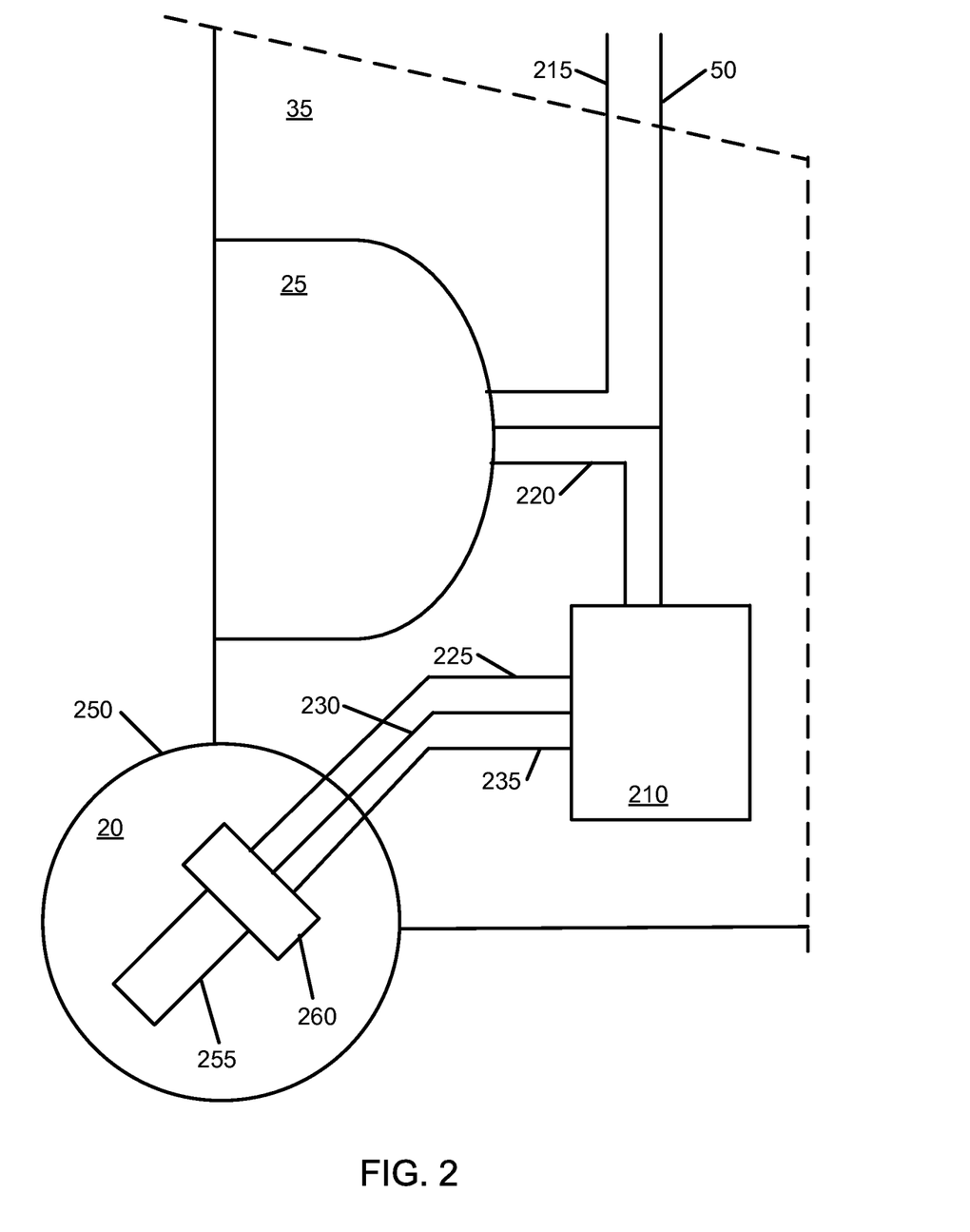
FIG. 2 is an illustration of a light system, an exemplary sensor module, and an exemplary power line communication module.

FIG. 2 is an illustration of a light system 25, an exemplary landing sensor module 20, and an exemplary landing power line communication module 210. In one implementation the power bus 50 is always active and the landing light 25 may be controlled by a separate control line 215, which may be an electrical conductor or a fiber optic cable. In another implementation the power bus 50 is always active, a control line 215 is not used, and the power line communication module 210 is responsive to landing light control signals on the power bus 50 to provide control signals to the landing light 25 via, for example, a control line 220, which may be an electrical conductor or a fiber optic cable. In another implementation, the control line 215 is not used and the power line communication module 210 is responsive to landing light control signals on the power bus 50 to provide power from the power bus 50 to the landing light 25 via, for example, a conductor, also represented by line 220. In another implementation the power bus 50 is only active when the landing light 25 is to be turned on, and in this implementation the sensor module 20 is only active when the landing light 25 is turned on and neither line 215 nor 220 are necessary.

In one embodiment, the sensor module 20 is enclosed within a small "fish-eye" bubble 250 on the front edge of the wing 35. Inside the bubble 250 are a sensor 255 and a sensor direction mechanism 260. The mechanism 260 allows the pilot to turn the camera to see, for example, in front of the aircraft, to the side of the aircraft, toward the rear of the aircraft, and even to view the top of the wing 35 to determine whether there is ice on the wing. The design and construction of sensors 255 and mechanisms 260 for aiming a sensor, for example, a camera, are well known and are not described herein.

Figure 2A:
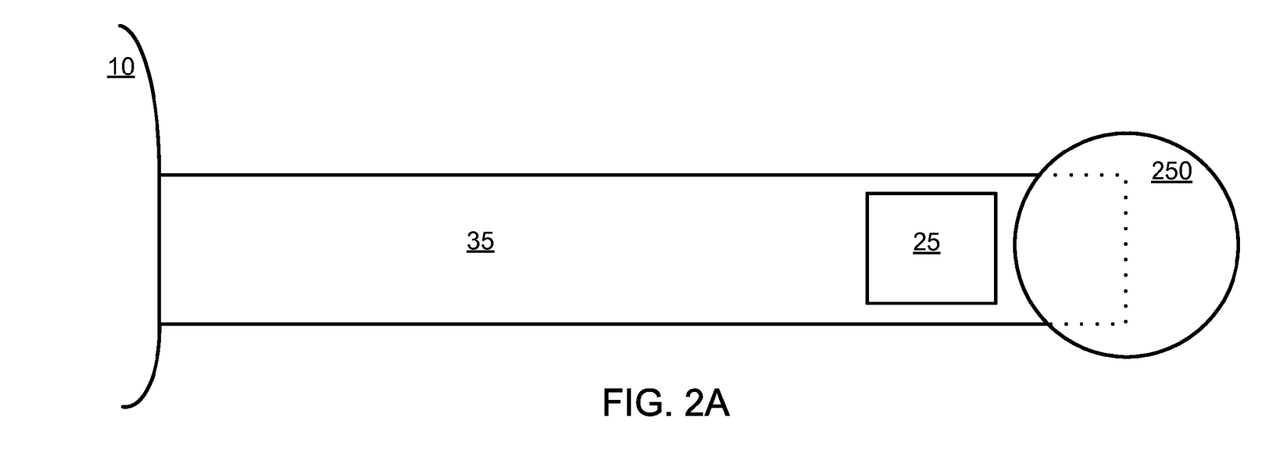
FIG. 2A shows a front view of an exemplary bubble on the front edge of a wing.

FIG. 2A shows a front view of a landing light 25 and an exemplary bubble 250 enclosing a sensor module 20 (not shown) on the front edge of a wing 35.

Figure 2B:
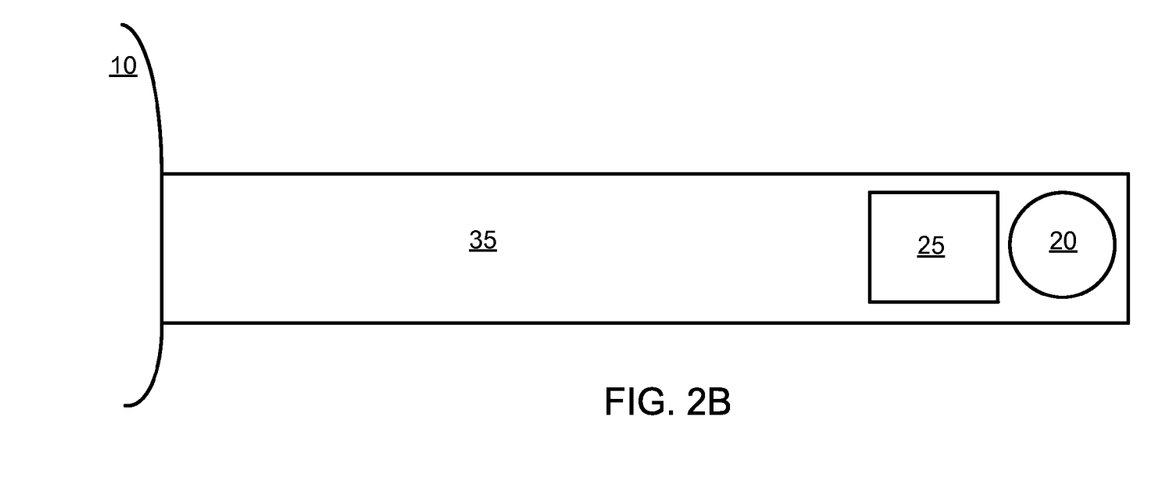
FIG. 2B shows a front view of an alternative implementation of a landing light and an exemplary sensor module on the front edge of a wing.

FIG. 2B shows a front view of an alternative implementation of a landing light 25 and an exemplary sensor module 20 on the front edge of a wing 35. In this implementation the sensor module 20 contains a sensor which is pointed directly forward of the wing 35. In an alternative implementation, the sensor module 20 contains a sensor and a sensor direction mechanism (not shown) so that the sensor may be caused to view, to a limited degree, directly ahead, toward the left, toward the right, upwardly, or downwardly.

The sensor module 20 provides sensor data from the sensor 255 to the power line communication module 210 via, for example, link 225, which may be an electrical conductor or a fiber optic cable. The power line communication module 210 may provide control data to the sensor direction mechanism 260 of the sensor module 210 via, for example, link 230, which may be an electrical conductor or a fiber optic cable. Alternatively, a single conductor or link, either 225 or 230, may be used for bidirectional communications between the sensor module 20 and the power line communication module 210. The power line communication module 210 may selectively or continuously provide operating power to the sensor module 20 via an electrical conductor 235.

The power line communication module 210 may be any device which can place data from the sensor module 20 onto the power bus 50 and, preferably, can retrieve control data from the power bus 50 to provide the control data to the sensor module 20 and, under some implementations, to the landing light 205. On an aircraft, devices and communication protocols approved for use on an aircraft would be used. On other vehicles, devices and protocols approved for use on those vehicles would be used, if required. Methods and devices for communicating information over power lines are known in the art.

The power line and wireless communication module 65 (FIG. 1) may be single device which retrieves sensor data from the power bus 55 and wirelessly transmits the sensor data and, if desired, wirelessly receives control data and places the control data onto the power bus 55. Alternatively, the power line and wireless communication module 65 may be, for example, two devices which are connected to each other and can transfer data from one to the other: one communication device which retrieves sensor data from the power bus 55 and, if desired, places control data onto the power bus 55, and another communication device which wirelessly transmits sensor data and, if desired, wirelessly receives control data. On an aircraft, devices and wireless protocols approved for use on an aircraft would be used. On other vehicles, devices and protocols approved for use on those vehicles would be used, if required. Methods and devices for wireless communication are also known in the art. An example of a generic wireless communication device is an Aironet 600 series OfficeExtend Access Point, manufactured by Cisco™. For convenience, the discussion above with respect to FIGS. 2, 2A and 2B has been with respect to a wing 35. The discussion above also applies, however, to other locations, such as but not limited to a vertical stabilizer 75, wheel wells, etc.

Figure 3:
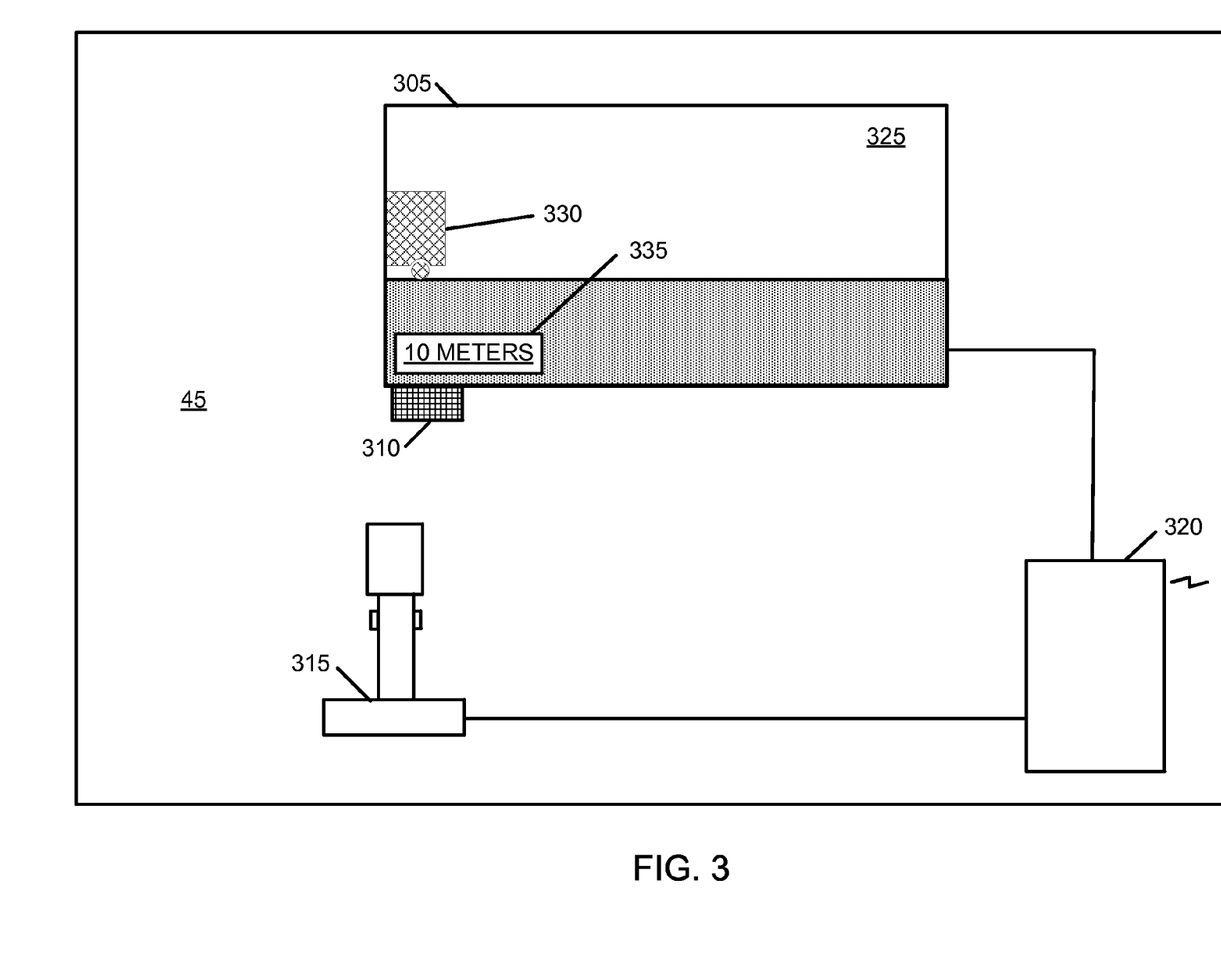
FIG. 3 is an illustration of an exemplary human interface unit in the cockpit of the aircraft.

FIG. 3 is an illustration of an exemplary human interface unit 45 in the cockpit 12 of the aircraft 10. The unit 45 preferably comprises a visual display unit 305, a sound-producing unit 310, and a user control device 315, functionally connected to a wireless communication module 320. The visual display unit 305 may be, for example, a monitor. The sound-producing unit 310 may be, for example, a speaker or a buzzer. The user control device 315 may be, for example, a joystick having various control buttons thereon, a panel having direction control and other buttons, etc. There may also be a vibrating apparatus connected to the user control device 315 and/or one or more other user controls. In an alternative embodiment, the wireless communication module 320 may provide information to and/or receive information from an existing cockpit display and/or an existing user control device rather than an additional visual display unit 305 and/or user control device 315. In one implementation, the wireless communication devices 65 and 320 are IP-based (Internet Protocol based) Wi-Fi devices. Other protocols may also be used, if desired.

The exemplary visual display unit 305 depicts an exemplary view 325 as seen by a camera. In this exemplary view, assuming that the camera is looking directly ahead, the pilot can see that, there is a vehicle 330 present and that continuing in that direction may cause a collision between the wing 35 and the vehicle 330. Having this information, the pilot can then take action to slow, stop, and/or turn the aircraft 10 to avoid collision with the vehicle 330. The partial vehicle 330 is shown as a truck purely for convenience of illustration; the object shown in the view 325 could also be another aircraft, a barrier, a sign or light, etc. Also, the pilot can rotate the camera (or other sensor) to view the wing itself so that icing of the wing may be seen, or to view the landing gear to verify that any tire chocks have been removed, and, if the bubble 250 is on a corner of the wing, to view at least a portion of the area behind the aircraft.

The IR sensor can potentially provide valuable information that a camera cannot. For example, assume that it is a dark and moonless night, it is raining, and that an electrical failure on a dark-colored panel truck, for example, a food service truck, has rendered the truck inoperative and without any lighting. The pilot may not be able to see the truck, even with a camera, because of the environmental conditions (dark, moonless, raining) The IR sensor, however, can detect the heat being emitted by the vehicle's engine or exhaust system, and can present an image of some sort (fine or rough) or present an indication of some sort (flashing light, an icon on the screen, etc.) to inform the pilot that there is an object present. The pilot can then look more closely or even ask ground control for assistance in verifying the presence of the object and/or removing the object.

The use of a proximity sensor can provide additional information to the pilot, especially in the case of, but not limited to, the example directly above. For example, the IR sensor may detect the disabled vehicle, but the pilot might not be able to see the vehicle. The proximity sensor can, however, provide information as to the distance to the vehicle or object to assist the pilot to make an informed decision as to what action to take. For example, text warning block 335 indicates that the distance to the vehicle 330 is 10 meters. If the distance is very short then the pilot may need to make an emergency stop or maneuver to avoid hitting the vehicle 330. If, however, the distance is sufficiently great then the pilot may be able to steer gently around the vehicle 330 or other object.

In theory, one could route an electrical cable or a fiber optic cable so as to transmit signals between the wingtip and the cockpit. In practice, however, this requires additional wiring in the wing and in the fuselage, adds weight to the aircraft 10, adds complexity to the wiring harnesses in the fuselage and wings, and increases the cost of construction. Further, the time and cost to add such sensor-to-display wiring may be impractical for retrofitting an existing aircraft.

Also, in theory, the signals could be transmitted between wingtip and the cockpit display over the power buses 50 and 55. In practice, however, the higher frequency signals that are necessary to convey images are blocked or extremely attenuated by the various electrical connections and devices on the bus 55. Also, in theory, the signals could be transmitted wirelessly between wingtip and the cockpit display. In practice, however, the signals are extremely attenuated by the aircraft skin.

The use of an existing power bus to convey information between the wingtip and the fuselage, and a wireless system to convey information between the fuselage and the display in the cockpit provides benefits regarding cost, weight and ease of installation. Existing wiring can be used rather than having to install additional wiring in the wing and/or fuselage; and existing aircraft can be retrofitted without modification of existing wiring or addition of wiring.

Figure 4A:
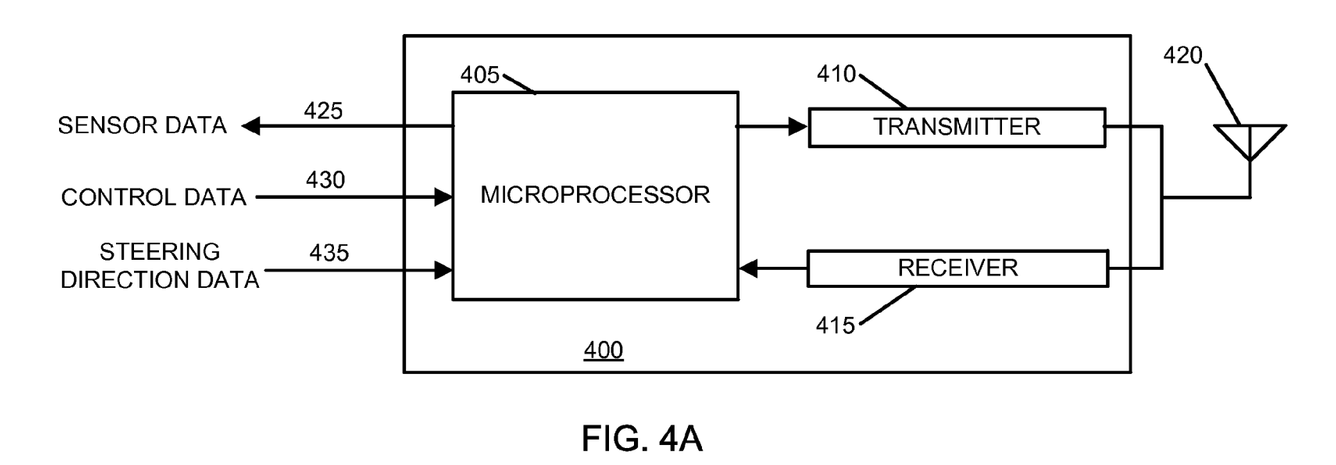
FIG. 4A is a block diagram of an exemplary wireless communication module.

FIG. 4A is a block diagram of an exemplary wireless communication module 400 which may be used to implement a wireless communication module 320. There may be a microprocessor 405, a wireless transmitter 410, and a wireless receiver 415, the transmitter and receiver being connected to an antenna 420. Sensor data may be provided directly from the receiver 415 onto the sensor data output line 425 or, preferably, may be provided from the receiver 415 to the microprocessor 405. The microprocessor 405 may format the data according to the desired wireless transmission protocol, for example, such as a packet-based or Internet-Protocol-based method. The microprocessor may also compress or encrypt the data, modify the data so that the presentation system 305 presents the information in the desired human-perceivable format, such as a picture, text, an audible alarm, etc. Likewise, control data may be provided directly from the control data line 430 to the transmitter 410 or, preferably, may be provided from the control unit 315 to the microprocessor 405, which may modify the data to remove or modify signals before sending them to the transmitter, or even to send a status or other signal back to the pilot, as sensor or control data for example, that the requested command cannot be executed because the sensor 255 or sensor direction mechanism 260 is already at the end of its range. Further, steering direction data may be provided on the steering direction data control line 435 to the processor 405 which can process that data to send a signal or signals which cause the sensor direction mechanism 260 to point the sensor in the direction that the aircraft is turning (sometimes referred to as an "anticipation" view).

Figure 4B:
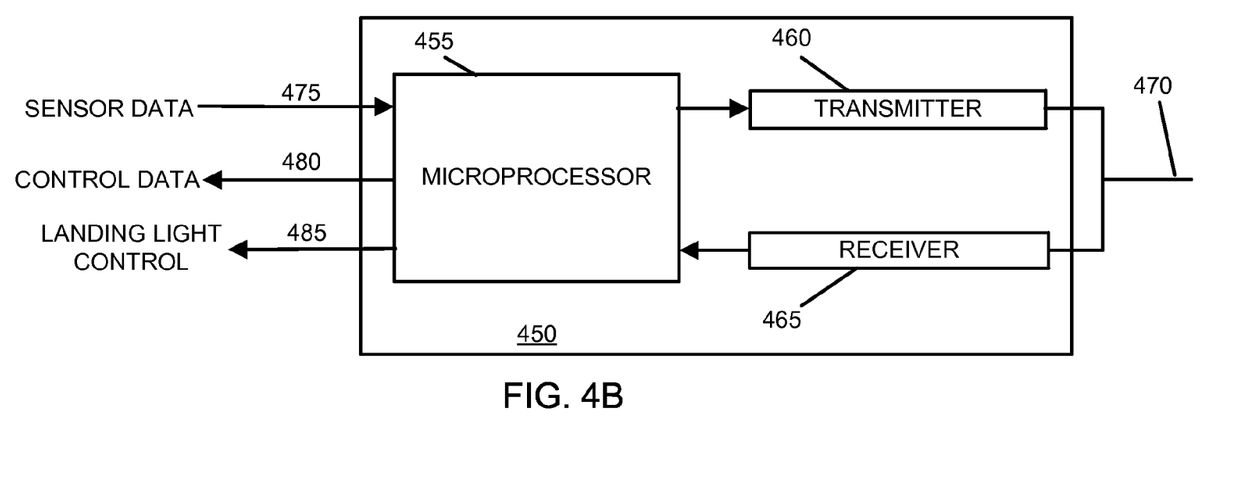
FIG. 4B is a block diagram of an exemplary power line communication module.

FIG. 4B is a block diagram of an exemplary power line communication module 450 which may be used to implement a power line communication module 210. There may be a microprocessor 455, a power line transmitter 460, and a power line receiver 465, the transmitter and receiver being connected to a power line 470. Sensor data 475 may be provided directly from the sensor 255 to the transmitter 460 or from the sensor 255 to the microprocessor 455, which may modify the data to remove noise, perform data compression to reduce the bandwidth, data encryption, etc. Likewise, control data may be provided directly to the control data line 480 from the receiver 465 or may be provided from the control unit 315 to the microprocessor 405, which may modify the data to remove noise, determine the position of the sensor before attempting to change the direction of the sensor, etc. The microprocessor 455 may also process data from the receiver 465 to send a landing light control signal over line 485.

Communication module 65, which performs both wireless and power line communications, may be implemented by combining the wireless system illustrated in FIG. 4A and the power line system illustrated in FIG. 4B, with or without a microprocessor. For example, a power line receiver 465 could provide the sensor data to a wireless transmitter 410, and a wireless receiver 415 could provide the control data directly to a power line transmitter 460.

The power line and wireless bandwidth requirements are not critical as long as the desired sensor picture and/or information can be reliably and timely conveyed from the sensor to the human interface unit. Also, the particular data format used is not critical as long as the sensor and control information can be reliably conveyed between the sensor and the human interface unit. Commercially available, off-the-shelf power line communication modules and wireless communication modules may be provided that they meet the requirements for use in the operating environment of the particular airplane involved.

A microprocessor, for example, microprocessor 405 and/or 455, will typically include a central processing unit ("CPU"), memory, including a random access memory ("RAM") and a read-only memory ("ROM"), and a system bus that couples the memory to the CPU. A basic input/output system containing the basic routines that help to transfer information between elements within the computer architecture, such as during startup, may be stored in the ROM. The computer architecture may further include a mass storage device for storing the operating system and instructions regarding the tasks to be performed, such as data compression or expansion, noise reduction, determining the signals to provide an anticipation view, etc. The mass storage device and its associated computer-readable media may provide non-volatile storage for the computer architecture. By way of example, and not limitation, computer storage media may include volatile and non-volatile media implemented in any convenient method or technology for storage of information such as computer-readable instructions, data structures, program modules or other data. For example, computer media includes, but is not limited to, RAM, ROM, EPROM, EEPROM, flash memory or other solid state memory technology, or any other medium which can be used to store the desired information and which can be accessed by the computer architecture. With regard to the claims, the phrase "computer storage medium" and variations thereof, does not include waves, signals, and/or other transitory and/or intangible communication media, per se.

In one or more embodiments, a sensor, such as but not limited to a first sensor, or as included in a sensor module, may be a camera to generate a video signal representative of the visual environment. Further, a sensor, such as but not limited to a first sensor, or as included in a sensor module, may be an image-stabilized camera to generate a video signal representative of the visual environment. Still further, a sensor, such as but not limited to a first sensor, or as included in a sensor module, may be a proximity sensor to detect an object in the vicinity.

According to one or more embodiments, a sensor or sensor array may be used to detect a potential threat to an aircraft or other vehicle. In such an embodiment, a threat such as a missile, a rocket-propelled grenade, or other projectile may be launched in proximity to the aircraft. As described, an automated sensor system may detect the presence of such a threat, analyze a perceived risk, and provide one or more responses. The potential responses can include, but are not limited to, providing an indication on a display or auditory alert, transmitting a signal to a receiver indicating a threat is detected and possibly indicating information about the detected threat, and/or possibly launching a decoy such as flares or a countermeasure to the detected threat. The retrofit capability of various disclosed features herein may provide an advantage when compared with a traditionally higher cost of modifications to an airframe structure, including penetrations, modifications, and repairs. Further, an advantage may include the discrete nature of such a retrofit where an aircraft or other vehicle may unobtrusively possess such sensory capabilities in a less-observable manner.

According to one or more embodiments, a sensor control signal for a sensor, such as but not limited to a first sensor control signal for a first sensor, may be provided to control at least one of the following sensor features: zoom, direction, focus, light filtering, or wavelength filtering. Further, a sensor control signal for a sensor, such as but not limited to a first sensor control signal for a first sensor, may be provided to specify a desired sensor direction, the sensor direction being one of at least forward, to the side, and aft relative to the fuselage of the aircraft.

According to one or more embodiments, a user control device may be a human interface unit and may provide a steering direction signal, that signal may be wirelessly transmitted, that wirelessly-transmitted steering direction signal may be received and then transmitted as a control signal over a power line, that power line control signal may be received, and the sensor pointed in an anticipatory direction indicated by the steering direction signal. Further, the human interface unit can alternately present sensor data from a first sensor and sensor data from a second sensor. Still further, the human interface unit may include a first monitor and a second monitor, the first monitor presenting sensor data from a first sensor and the second monitor presenting sensor data from a second sensor. Yet still further, the human interface unit may have a screen which is responsive to the sensor signal to display at least a portion of the visual environment.

According to one or more embodiments, the human-perceivable format may be a visual display, an audible sound, or both. Further, the human-perceivable format may include sound, and a sensor, sensor array, or a sensor module, may have a proximity sensor to detect an object in the vicinity and provide a detection signal, where the human interface unit may have an audible alarm responsive to the sensor signal.

According to one or more embodiments, with respect to an aircraft having an aircraft component such as, but not limited to, a wing, and wherein the wing has a landing light module connected to a power line in the wing, the communication module in the wing may route operating power from the power line in the wing to a sensor in or on the wing. Further, with respect to an aircraft having an aircraft component such as, but not limited to, a tail section vertical stabilizer, and wherein the tail section vertical stabilizer has a beacon light connected to the power line in the tail section, the communication module in the tail section may route operating power from the power line in the tail section to a sensor in or on the tail section. Still further, a communication module in an aircraft component, such as but not limited to a wing or a tail section vertical stabilizer, may receive operating power from the power bus in that aircraft component. Yet still further, with respect to a vehicle, the sensor communication module may receive operating power from a vehicle power bus.

In some cases, words preceding the term "communication module", for example, first, wing, wireless, etc., are used herein for convenience to distinguish one communication module from another communication module and do not indicate an order, a priority, or a required physical location unless otherwise expressly stated. Further, although the above illustration and discussion has been directed primarily to aircraft, the techniques disclosed herein are applicable to airplanes and helicopters, and also applicable to other vehicles, such as automobiles, buses, trucks, trains, boats, and hovercraft. Various non-vehicle applications may include street lights, building perimeter lights, cell phone towers, or other similar structures.

It is to be understood that the appended claims are not necessarily limited to the specific features, configurations, acts, or media described herein. Rather, the specific features, configurations, acts and mediums are disclosed as example forms of implementing the claims. Further, the phrase "for example", as used herein, means "for example, but not limited to," unless expressly stated otherwise or the context clearly and unmistakably requires otherwise.

The subject matter described above is provided by way of illustration only and should not be construed as limiting. Various modifications and changes may be made to the subject matter described herein without following the example configurations and applications illustrated and described, and without departing from the true spirit and scope of the present disclosure, which is set forth in the following claims.

What is claimed is:

1. An aircraft comprising:
a fuselage, a cockpit connected to the fuselage, and an aircraft component connected to the fuselage;
the aircraft component comprises a first sensor, a first communication module, and a first power line;
the first sensor is responsive to an environment in the vicinity of the aircraft to provide first sensor data; and
the first communication module receives the first sensor data and places a first power line data signal on the first power line by modulating a power line data carrier with the first sensor data;
the fuselage comprises a second communication module and a second power line;
the second power line is connected to the first power line; and
the second communication module receives the first power line data signal on the second power line, retrieves the first sensor data from the first power line data signal, and transmits a wireless data signal within the fuselage by modulating a wireless data carrier with the first sensor data retrieved from the first power line data signal; and
the cockpit comprises a human interface unit and a third communication module;
the third communication module receives the wireless data signal, retrieves the first sensor data from the wireless data signal, and provides the first sensor data to the human interface unit; and
the human interface unit receives the first sensor data provided by the third communication module, and presents the first sensor data in a human-perceivable form.

2. The aircraft of claim 1, wherein the human interface unit comprises a visual display.

3. The aircraft of claim 1, wherein the first sensor comprises at least one of a camera, an infrared sensor, an ultraviolet light sensor, and a proximity sensor.

4. The aircraft of claim 1 wherein the second communication module transmits the wireless data signal at a power level that complies with Federal Aviation Administration or other governmental requirements regarding radio emissions within a cabin of the aircraft.

5. The aircraft of claim 1, wherein the human interface unit comprises a user control to provide a control signal to control the first sensor,
the third communication module is responsive to the control signal from the user control to transmit a wireless first sensor control signal within the fuselage by modulating a wireless control carrier with the first sensor control signal, the second communication module receives the wireless control signal, retrieves first sensor control data from the wireless control signal, and provides a first sensor power line control signal on the second power line by modulating a power line control carrier with the retrieved first sensor control data, and the first communication module receives the first sensor power line control signal, retrieves the first sensor control data from the first sensor power line control signal, and provides the retrieved first sensor control data to the first sensor.

6. The aircraft of claim 5, wherein the cockpit further comprises an aircraft steering system to control a steering direction of the aircraft when the aircraft is on the ground, and the aircraft steering system provides a steering direction control signal to the third communication module, the third, second, and first communication modules transfer the steering direction control signal from the aircraft steering system to the first sensor, and the first sensor is responsive to the steering direction control signal to provide an anticipation view based on the steering direction.

7. The aircraft of claim 1, and further comprising:

a second aircraft component connected to the fuselage, the second aircraft component comprising a second sensor, a fourth communication module, and a third power line;

the second sensor is of a different type than the first sensor, and is responsive to the environment in the vicinity of the aircraft to provide second sensor data; and the fourth communication module places a second power line data signal on the third power line by modulating a fourth power line data carrier with the second sensor data; and wherein the third power line is connected to one of the first power line or a fourth power line;

wherein the second communication module receives the second power line data signal on one of the first power line or the fourth power line, retrieves the second sensor data from the second power line data signal, and transmits the wireless data signal by also modulating the wireless data carrier with the second sensor data retrieved from the second power line data signal;

wherein the third communication module retrieves the second sensor data from the wireless data signal, and provides the second sensor data to the human interface unit; and wherein the human interface unit presents the second sensor data in a human-perceivable form.

8. An aircraft vicinity visualization system for an aircraft having a fuselage, a cockpit connected to the fuselage, and an aircraft component connected to the fuselage, the aircraft component having an aircraft power bus which is connected to a fuselage power bus in the fuselage, the system comprising:

a sensor module, to be installed in the aircraft component, and responsive to an environment in a vicinity of the aircraft to provide a sensor signal representative of the environment;

an aircraft component communication module, to be installed in the aircraft component and connected to the aircraft power bus, and responsive to the sensor signal to place a power line sensor signal on the aircraft power bus;

a fuselage communication module, to be installed in a fuselage of the aircraft and connected to the fuselage power bus, to receive the power line sensor signal and transmit a corresponding wireless sensor signal within the fuselage;

a cockpit communication module, to be installed in or near a cockpit of the aircraft, to receive the wireless sensor signals and to provide a recovered sensor signal; and a human interface unit, to be installed in the cockpit and connected to the cockpit communication module, and responsive to the recovered sensor signal to provide information regarding the environment in a human-perceivable form.

9. The system of claim 8, wherein the human interface unit comprises a visual display.

10. The system of claim 8, wherein the sensor module comprises at least one of a camera, an infrared sensor, an ultraviolet light sensor, and a proximity sensor.

11. The system of claim 8 wherein the fuselage communication module transmits the wireless sensor signal at a power level that complies with Federal Aviation Administration or other governmental requirements regarding radio emissions in the fuselage of the aircraft.

12. The system of claim 8, wherein the aircraft component communication module comprises a transmitter to generate the power line sensor signal by modulating a power line carrier signal in response to the sensor signal.

13. The system of claim 8, wherein the fuselage communication module comprises a receiver to receive and demodulate the power line sensor signal to provide a demodulated signal, and a transmitter to generate the corresponding wireless sensor signal by modulating a wireless carrier signal in response to the demodulated signal.

14. The system of claim 8, wherein the aircraft component communication module provides operating power from the aircraft power bus to the sensor module.

15. A vehicle environment sensing system, the vehicle having a first section and a human operator area in a second section, the system comprising:

a sensor module, to be installed in the first section, responsive to an environment of the vehicle to provide a sensor signal representative of the environment, and responsive to a control signal to adjust an operation of the sensor module;

a sensor communication module, to be installed in the first section and connected to the sensor module and to a vehicle power bus in the first section, responsive to the sensor signal to place a power line sensor signal on the vehicle power bus, and responsive to a power line control signal on the vehicle power bus to provide the control signal to the sensor module;

an intermediate communication module, to be installed in the second section of the vehicle and connected to the vehicle power bus, to receive the power line sensor signal and transmit a wireless sensor signal within at least one of the first and second sections of the vehicle, and to receive a wireless control signal and place the power line control signal on the vehicle power bus;

a wireless communication module, to be installed in or near the human operator area in the second section of the vehicle, to receive the wireless sensor signal and provide a recovered sensor signal, and to transmit the wireless control signal responsive to the control signal;

a human interface unit, to be installed in the human operator area and connected to the wireless communication module, responsive to the recovered sensor signal to provide information regarding the environment in a human-perceivable form; and a user control, to be installed in the human operator area and connected to the wireless communication module, to generate the control signal to control the operation of the sensor.

16. The system of claim 15, wherein the human interface unit comprises a visual display.

17. The system of claim 15, wherein the sensor module comprises at least one of a camera, an infrared sensor, an ultraviolet sensor, and a proximity sensor.

18. The system of claim 15, wherein the sensor communication module comprises a transmitter to generate the power line sensor signal by modulating a power line carrier signal in response to the sensor signal.

19. The system of claim 15 wherein the intermediate communication module transmits the wireless sensor signal at a power level that complies with governmental requirements for radio emissions in the human operator section.

20. The system of claim 15, wherein the intermediate communication module comprises a receiver to receive and demodulate the power line sensor signal to provide a demodulated signal, and a transmitter to generate the wireless sensor signal by modulating a wireless carrier signal in response to the demodulated signal.

21. The system of claim 15, wherein the sensor communication module provides operating power from the vehicle power bus to the sensor module.

22. A method to provide information regarding an environmental condition in the vicinity of a vehicle, the method comprising:

in the vehicle, providing a sensor signal representative of the environmental condition in the vicinity of the vehicle;

transmitting the sensor signal over a power line in the vehicle;

receiving the sensor signal transmitted over the power line and transmitting a corresponding wireless sensor signal within the vehicle;

receiving the wireless sensor signal and recovering the sensor signal; and presenting the recovered sensor signal in a human-perceivable form.

23. The method of claim 22 wherein the wireless signal is transmitted at a power level that complies with a radiated field emission standard requirement for the vehicle.

24. The method of claim 22, and further comprising:
receiving a control signal from a user control device;
wirelessly transmitting the control signal;
receiving the wirelessly transmitted control signal and transmitting a corresponding power line control signal;
receiving the power line control signal and recovering the control signal; and
providing the recovered control signal to the sensor to control the operation of the sensor.

25. The method of claim 22, wherein receiving the wireless sensor signal, recovering the sensor signal, and presenting the recovered sensor signal in a human-perceivable form occur in a location that is one of internal to and external to the vehicle.

* * * * *